US007003321B2

(12) United States Patent
Aburakawa et al.

(10) Patent No.: US 7,003,321 B2
(45) Date of Patent: Feb. 21, 2006

(54) MOBILE COMMUNICATION SYSTEM AND SWITCHING APPARATUS

(75) Inventors: Yuji Aburakawa, Yokohama (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 447 days.

(21) Appl. No.: 10/004,885

(22) Filed: Dec. 7, 2001

(65) Prior Publication Data
US 2002/0094842 A1 Jul. 18, 2002

(30) Foreign Application Priority Data
Dec. 8, 2000 (JP) .............................. 2000-375190

(51) Int. Cl.
H04B 1/38 (2006.01)
H04B 10/12 (2006.01)
(52) U.S. Cl. .................. 455/561; 455/550.1; 455/560; 455/73; 379/56.2; 379/56.1; 379/429
(58) Field of Classification Search ................ 455/560, 455/450, 561, 555, 550.1, 403, 90.1, 90.2, 455/73; 359/172, 173; 375/130, 135; 379/419, 379/56.2, 56.1, 429
See application file for complete search history.

(56) References Cited

U.S. PATENT DOCUMENTS

| 4,578,815 | A |   | 3/1986  | Persinotti |
|-----------|---|---|---------|------------|
| 5,566,173 | A |   | 10/1996 | Steinbrecher |
| 5,682,256 | A |   | 10/1997 | Motley et al. |
| 5,802,173 | A | * | 9/1998  | Hamilton-Piercy et al. ........................ 379/56.2 |
| 5,969,837 | A | * | 10/1999 | Farber et al. ............... 379/56.2 |
| 5,982,854 | A | * | 11/1999 | Ehreth ........................ 379/56.2 |
| 6,047,188 | A | * | 4/2000  | Noda et al. ................. 455/450 |
| 6,195,566 | B1 |   | 2/2001  | Kanai |
| 6,324,391 | B1 | * | 11/2001 | Bodell ........................ 455/403 |
| 6,336,042 | B1 | * | 1/2002  | Dawson et al. .......... 455/562.1 |
| 6,480,522 | B1 | * | 11/2002 | Hoole et al. ................ 375/130 |
| 6,497,599 | B1 | * | 12/2002 | Johnson et al. ............. 455/447 |
| 6,512,784 | B1 | * | 1/2003  | Schilling .................... 375/141 |
| 6,807,374 | B1 | * | 10/2004 | Imajo et al. ................ 398/115 |
| 6,937,878 | B1 | * | 8/2005  | Kim et al. .................. 455/561 |
| 2002/0181444 | A1 | * | 12/2002 | Acampora .................. 370/352 |
| 2003/0059039 | A1 | * | 3/2003  | Meyerson et al. ..... 379/428.04 |

FOREIGN PATENT DOCUMENTS

| EP | 1 113 594    | 7/2001  |
| JP | 4-212529     | 8/1992  |
| JP | 7-236169     | 9/1995  |
| JP | 9-284835     | 10/1997 |
| JP | 10-23497     | 1/1998  |
| WO | WO 97/40594  | 10/1997 |
| WO | WO 98/32250  | 7/1998  |
| WO | WO 00/25440  | 5/2000  |

* cited by examiner

Primary Examiner—Sonny Trinh
Assistant Examiner—Khai Nguyen
(74) Attorney, Agent, or Firm—Oblon, Spivak, McClelland, Maier & Neustadt, P.C.

(57) ABSTRACT

When a signal is sent from a wireless base station 3-1, a wireless modem 10-1 converts the signal to a signal of a unified transmission form. The switch 11-1 switches the signal to one of wireless transceivers 12-1, 12-2 and the optical transceiver 13-1. The wireless transceiver 12-1 or 12-2 sends the signal to a control station 4 or a wireless base station 3—3 via a wireless circuit 20. The optical transceiver 13-1 converts the signal into an optical signal and sends the optical signal to a wireless base station 3-2 via an optical fiber circuit 30.

21 Claims, 5 Drawing Sheets

MOBILE COMMUNICATION SYSTEM AND SWITCHING APPARATUS

BACKGROUND OF THE INVENTION

1. Field of the Invention

The present invention relates to a mobile communication system and a switching apparatus in the mobile communication system, in which the mobile communication system includes a plurality of base stations, a control station which controls the base stations and switching apparatuses each of which corresponds to the base station or the control station and switches a communication partner.

2. Description of the Related Art

FIG. 1 shows an example of a conventional mobile communication system. The mobile communication system shown in this figure includes three wireless base stations 3-1–3—3 and a control station 4 which controls the wireless base stations 3-1–3—3. In this mobile communication system, the wireless base stations are connected each other by using switching apparatuses 5-1–5-3 and wireless circuits 20 or an optical fiber circuit 30, and each wireless base station and the control station 4 are connected by using switching apparatuses 5-1–5-4 and the wireless circuits 20 or the optical fiber circuit 30, in which the switching apparatuses 5-1–5-3 are provided for the wireless base stations 3-1–3—3, and the switching apparatus 5-4 is provided for the control station 4.

For example, when a mobile terminal 1—1 sends a signal, the signal is received by the wireless base station 3-1, via an antenna 7-1, wherein the mobile terminal 1—1 is included in a cell 2-1 of the wireless base station 3-1. The signal received by the wireless base station 3-1 is received by a radio transceiver unit (RTRU) 21-1, 21-2 or an optical transceiver unit (OTRU) 31-1 by a switching operation of the switch 11-1 in the switching apparatus 5-1 according to the destination of the signal. Then, the signal is transmitted to another wireless base station 3-2 or 3—3, or to the control station 4 via the RTRU 21-1 or 21-2 and the wireless circuit 20, or via the OTRU 31-1 and the optical fiber circuit 30.

The RTRU in each of the switching apparatuses 5-1–5-4 includes a wireless modem 23 and a wireless transceiver (TR) 24, which are not shown in the RTRUs 21-1–21-6 in the switching apparatuses 5-1–5-3 of the wireless base stations 3-1–3—3 in FIG. 1. A signal which is received by the RTRU 21-1 is converted into a signal having a transmission form for wireless transmission by the wireless modem, and transmitted to the wireless circuit 20 via the antenna 22-1 by the wireless transceiver.

Each of the OTRUs 31-1–31-4 in the switching apparatuses 5-1–5-4 includes a signal converter 32 and an optical transceiver (E/C, O/E) 33, wherein the signal converter 32 and the optical transceiver 33 are not shown in the OTRUs 31-1–31-3 in the switching apparatuses 5-1–5-3 corresponding to the wireless base stations 3-1–3—3 in FIG. 1. For example, a signal input into the OTRU 31-1 is converted into a signal having a transmission form for optical transmission and the signal is transmitted to the optical fiber circuit 30 by the optical transceiver.

When receiving a signal, the operation of the wireless base station 3-2, 3—3 or the control station 4 is as follows. When the control station 4 receives the signal, a signal transmitted from the wireless base station at the sending side via the wireless circuit 20 or the optical fiber circuit 30 is received by the RTRU 21-7, 21-8 or the OTRU 31-4 in the switching apparatus 5-4 of the control station 4. Then, the signal is sent to a multiplexer/demultiplexer part 42 by a switching operation of the switch 11-4, and is sent to a mobile communication network via a circuit control apparatus 43.

When the receiving side is the wireless base station 3-2, a signal sent from the wireless base station 3-1 in the sending side via the optical fiber circuit 30 is received by the OTRU 31-2 in the switching apparatus 5-2, and the signal is sent to a mobile terminal 1-2 via an antenna 7-2 by a switching operation of the switch 11-2. In addition, when the receiving side is the wireless base station 3—3, a signal transmitted to the wireless circuit 20 from the wireless base station 3-1 is received by the RTRU 21-5 in the switching apparatus 5-3, and the signal is sent to the mobile terminal 1-3 via the antenna 7-3 by a switching operation of the switch 11-3.

However, since the wireless base stations or each wireless base station and the control station are connected by the wireless circuit 20 or the optical fiber circuit 30, the transmission medium is different according to the destination of the signal. Therefore, the switching apparatus 5 needs to convert a signal into a signal suitable for transmission medium. Thus, there is a problem in that sharability in the apparatus is low. Therefore, it is necessary to add or change the RTRU or the OTRU in the conventional switching apparatus when a transmission medium is added or changed. As a result, it is difficult to construct a network.

SUMMARY OF THE INVENTION

It is an object of the present invention to provide a mobile communication system and a switching apparatus in which sharability is improved.

The above object is achieved by a mobile communication system including a plurality of base stations, a control station which controls the base stations, and switching apparatuses each of which corresponds to the base station or the control station, wherein the switching apparatuses are connected with each other by a wireless circuit or an optical fiber circuit, the switching apparatus corresponding to a base station or a control station in a sending side including:

a modulation part for modulating a first signal into a second signal of a unified transmission form;

a first switching part for switching an output destination of the second signal from the modulation part according to a sending destination of the second signal; and a wireless signal transmission part for sending the second signal from the first switching part to a base station or a control station in a receiving side via a wireless circuit;

an optical signal transmission part for sending the second signal from the first switching part to a base station or a control station in a receiving side via an optical fiber circuit, the switching apparatus corresponding to a base station or a control station in a receiving side including:

a wireless signal receiving part for receiving a third signal via a wireless circuit;

an optical signal receiving part for receiving a third signal via an optical fiber circuit; and a demodulation part for demodulating the third signal.

According to the mobile communication system, the switching apparatus corresponding to the wireless base station or the control station in the sending side modulates a signal to be transmitted into a signal of a unified transmission form, and sends the signal to the switching apparatus of the wireless base station or the control station in the receiving side via a wireless circuit or an optical fiber circuit. That is, the signal is modulated such that the transmission form of the signal is unified. Therefore, the modulation part can be shared.

From the viewpoint of performing switching operation speedily in the first switching part, the switching apparatus corresponding to a base station or a control station in a sending side may further includes:

a frequency control part for controlling a frequency of the second signal output from the modulation part according to the sending destination;

wherein the first switching part switches the output destination according to the frequency of the second signal.

From the viewpoint of sharing the wireless signal transmission part, the switching apparatus corresponding to a base station or a control station in a sending side may further includes:

a variable directional antenna for sending the second signal from the wireless signal transmission part to a destination via the wireless circuit; and a beam forming part for directing the variable directional antenna to an antenna of a base station or a control station in a receiving side.

In addition, the switching apparatus corresponding to a base station or a control station in a sending side may further includes:

a variable directional antenna for sending the second signal from the wireless signal transmission part to a destination via the wireless circuit; and a beam forming part for directing the variable directional antenna to an antenna of a base station or a control station in a receiving side according to the frequency of the second signal.

From the viewpoint of enabling the demodulation part to be selected when the switching apparatus includes a plurality of demodulation parts, the switching apparatus corresponding to a base station or a control station in a receiving side may further includes a second switching part for switching an output destination of the third signal to a demodulation part.

From the viewpoint of performing switching operation speedily by the second switching part, the second switching part may switch the output destination of the third signal according to a frequency of the third signal.

From the viewpoint of performing demodulation properly when a plurality of signals are received simultaneously by the wireless signal receiving part and the optical signal receiving part, the switching apparatus corresponding to a base station or a control station in a receiving side may further includes a selection part for selecting a fourth signal and outputting the fourth signal to the demodulation part when a plurality of signals are received.

From the viewpoint of performing switching operation easily when the frequencies are different for each signal source, the switching apparatus corresponding to a base station or a control station in a receiving side may further include a frequency control part for controlling the demodulation part such that the demodulation part can demodulate the third signal according to a frequency of the third signal.

The switching apparatus corresponding to a base station or a control station in a receiving side may further include:

a variable directional antenna for receiving the third signal from the wireless circuit and outputting the third signal to the wireless signal receiving part;

a beam forming part for directing the variable directional antenna to an antenna of a base station or a control apparatus in a sending side. In the switching apparatus, the beam forming part may direct the variable directional antenna to an antenna according to a frequency of the third signal.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
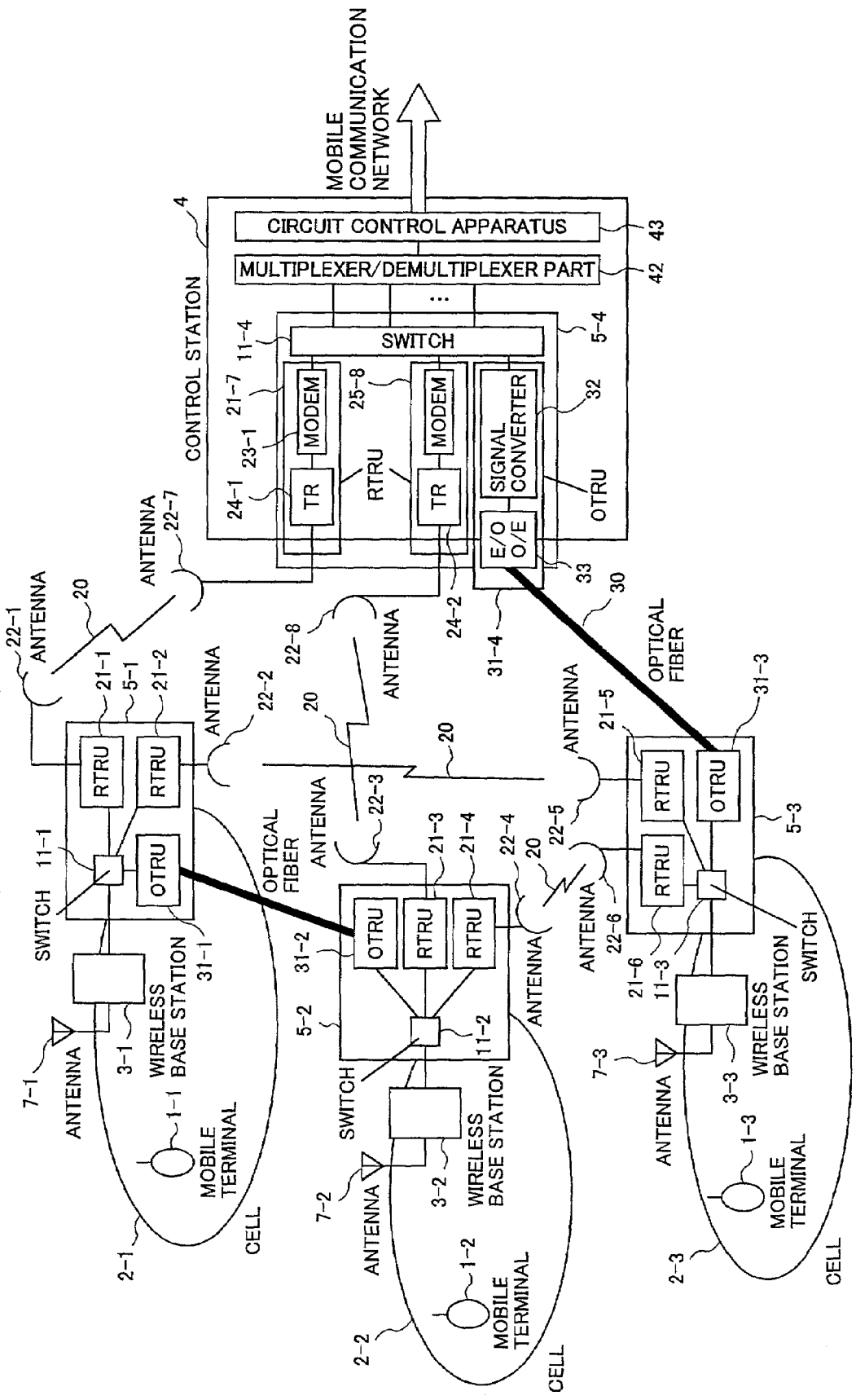
FIG. 1 shows a conventional mobile communication system.
Figure 2:
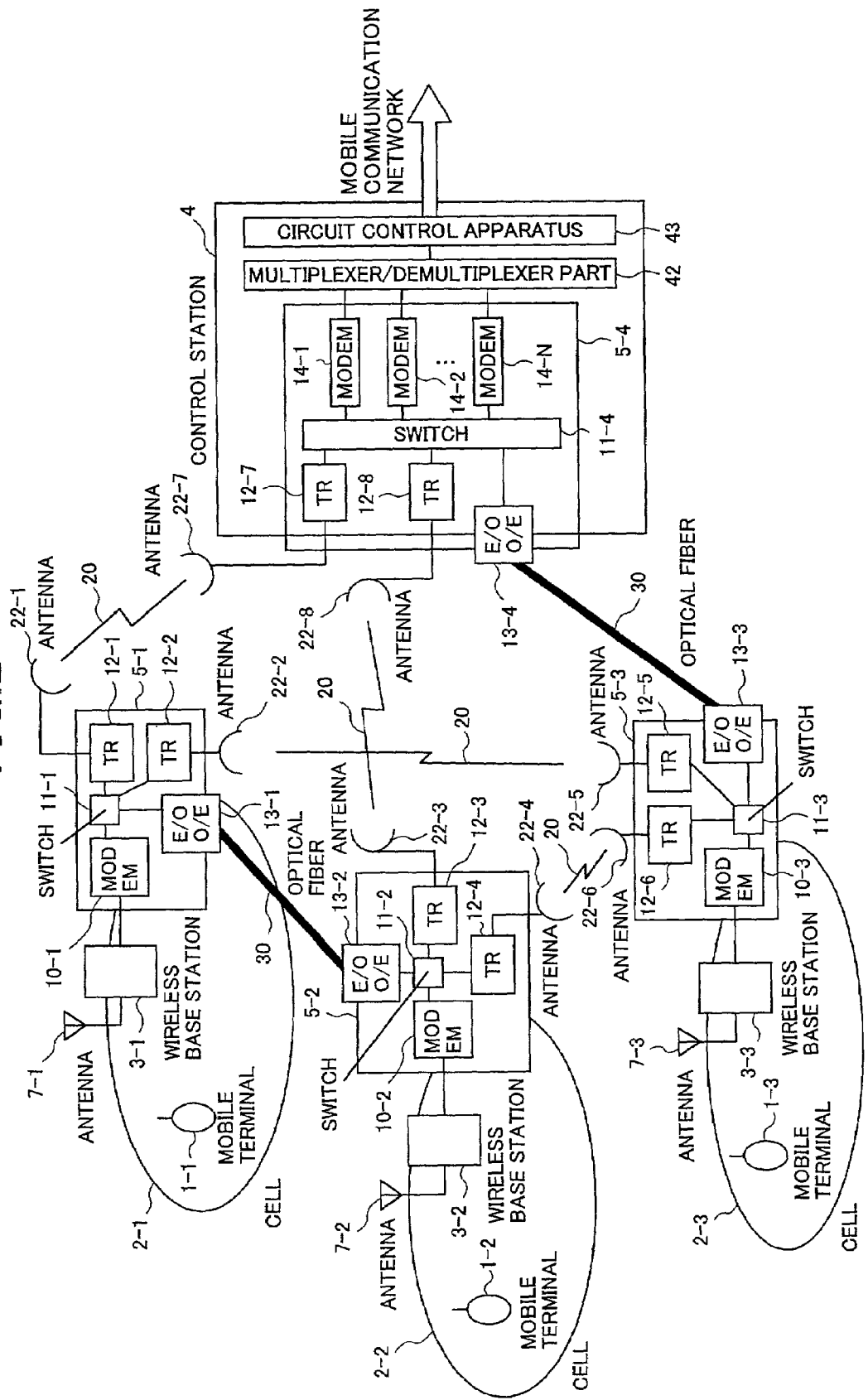
FIG. 2 shows a mobile communication system of a first embodiment of the present invention.

In the following, embodiments of the present invention will be described with reference to figures. FIG. 2 is a configuration example of a mobile communication system of a first embodiment of the present invention. The mobile communication system shown in FIG. 2 includes three wireless base stations 3-1-3—3 and a control station 4 which controls the wireless base stations 3-1-3—3. In this mobile communication system, the wireless base stations 3-1-3—3 are connected each other by using switching apparatuses 5-1-5-3 and wireless circuits 20 or an optical fiber circuit 30, and each wireless base station and the control station 4 are connected by using switching apparatuses 5-1-5-4 and the wireless circuits 20 or the optical fiber circuit 30, in which the switching apparatuses 5-1-5-3 are provided for the wireless base stations 3-1-3—3, and the switching apparatus 5-4 is provided for the control station 4. In this mobile communication system, each of the switching apparatuses 5-1-5-4 can switch a communication partner so that wireless base stations 3-1-3—3 and the control station 4 can communicate with each other.

The wireless base station 3-1 receives, via an antenna 7-1, a signal sent from a wireless terminal 1—1 which resides in a cell 2-1 which is covered by the wireless base station 3-1, and outputs the signal to the switching apparatus 5-1. In addition the wireless base station 3-1 sends the signal sent from the switching apparatus 5-1 to the wireless terminal 1—1 via the antenna 7-1. Each of the wireless base stations 3-2 and 3—3 has the same structure as the wireless base station 3-1.

The switching apparatus 5-1 provided for the wireless base station 3-1 includes a wireless modem (MODEM) 10-1, a switch 11-1, wireless transceivers (TR) 12-1 and 12-2, and an optical transceiver (E/O, O/E) 13-1. Each of the switching apparatus 5-2 for the wireless base station 3-2 and the switching apparatus 5-3 for the wireless base station 3—3 has the same structure as the switching apparatus 5-1.

When a signal is sent from the wireless base station 3-1 to the wireless base station 3-2, 3—3 or the control station 4, the wireless modem 101 converts the signal from the wireless base station 3-1 to a signal having a unified transmission form. For example, the wireless modem 10-1 converts the signal from the wireless base station 3-1 into a signal of a wireless frequency band (RF).

The switch 11-1 recognizes which is a sending destination of the signal among the wireless base stations 3-2, 3—3 and the control station 4, and switches the output destination of the signal from the wireless modem 10-1 to one of the wireless transceivers 12-1, 12-2 and the optical transceiver 13-1.

When the wireless transceiver 12-1 receives the signal from the switch 11-1, the wireless transceiver 12-1 sends the signal to the control station 4 via the antenna 22-1 and the wireless circuit 20. In the same way, when the wireless transceiver 12-2 receives the signal from the switch 11-1, the wireless transceiver 12-2 sends the signal to the wireless base station 3—3 via the antenna 22-2 and the wireless circuit 20. In addition, when the optical transceiver 13-1 receives the signal from the switch 11-1, the optical transceiver 13-1 converts the signal (electrical signal) to an optical signal and sends the optical signal to the wireless base station 3-2 via the optical fiber circuit 30.

On the other hand, when a signal is sent from the wireless base station 3-2, 3—3 or the control station 4 to the wireless base station 3-1, the wireless base station 3-1 operates in the following way.

That is, the wireless transceiver 12-1 receives a signal sent from the control station 4 via the wireless circuit 20 and the antenna 22-1. In the same way, the wireless transceiver 12-2 receives a signal sent from the wireless base station 3—3 via the wireless circuit 20 and the antenna 22-2. In addition, the optical transceiver 13-1 receives an optical signal sent from the wireless base station 3-2 via the optical fiber circuit 30 and converts the optical signal into an electrical signal.

The switch 11-1 outputs a signal received by the wireless transceiver 12-1, 12-2 or the optical transceiver 13-1 to the wireless modem 10-1. In this case, when equal to or more than two signals are received simultaneously by the wireless transceivers 12-1, 12-2 and the optical transceiver 13-1, the switch 11-1 selects and outputs the signal one by one to the wireless modem 10-1.

A plurality of wireless modems may be provided such that equal to or more than two signals can be demodulated simultaneously. In such a case, the switch 11-1 switches the signals such that each signal is received by a corresponding wireless modem. The wireless modem 10-1 demodulates the signal from the switch 11-1 and outputs the demodulated signal to the wireless base station 3-1. The wireless base station 3-1 sends this signal to the wireless terminal 1-1 residing in the cell 2-1 of the wireless base station 3-1.

The control station 4 includes a switching apparatus 5-4, a multiplexer/demultiplexer part 42, and a circuit control apparatus 43. The switching apparatus 5-4 includes wireless transceivers (TR) 12-7, 12-8, an optical transceiver (E/O, O/E) 13-4, and wireless modems (MODEM) 14-1–14-N.

When a signal is sent from the wireless base station to the control station 4, the control station operates in the following way. That is, the wireless transceiver 12-7 receives a wireless signal sent from the wireless base station 3-1 via the wireless circuit 20 and the antenna 22-7. In the same way, the wireless transceiver 12-8 receives a wireless signal sent from the wireless base station 3-2 via the wireless circuit 20 and the antenna 22-8. In addition, the optical transceiver 13-4 receives an optical signal sent from the wireless base station 3—3 via the optical fiber circuit 30. The switch 11-4 switches an output destination of a signal received from the wireless transceiver 12-7, 12-8 or the optical transceiver 13-4 to one of the wireless modems 14-1–14-N. Since the control station 4 may receive a plurality of signals simultaneously from the wireless base stations, the switch 11-4 may operate such that each signal is input to a different wireless modem. Each of the wireless modems 14-1–14-N demodulates a signal from the switch 11-4. The demodulated signal is multiplexed by the multiplexer/demultiplexer part 42, and is sent to the mobile communication network via the circuit control apparatus 43.

On the other hand, when a signal is sent from the control station 4 to the wireless base station 3-1–3—3, a signal from the mobile communication network is input into the multiplexer/demultiplexer part 42 via the circuit control apparatus 43. Then, after the signal is demultiplexed by the multiplexer/demultiplexer part 42, the demultiplexed signals are input into the wireless modems 14-1–14-N. Each of the wireless modems 14-1–14-N converts the demultiplexed signal into a signal of a unified transmission form. For example, each of the wireless modems 14-1–14-N converts the demodulated signal into a signal of a wireless frequency band (RF) like the wireless modem 10-1. The switch 11-4 recognizes a sending destination of the signal among the wireless base stations 3-1–3—3 and switches an output destination of the signal from each of the wireless modems 14-1–14-N to one of the wireless transceivers 12-7, 12-8 and the optical transceiver 13-4. When the wireless transceiver 12-7 receives a signal from the switch 11-4, the wireless transceiver 12-7 sends the signal to the wireless base station 3-1 via the antenna 22-7 and the wireless circuit 20. In the same way, when the wireless transceiver 12-8 receives the signal from the switch 11-4, the wireless transceiver 12-8 sends the signal to the wireless base station 3-2 via the antenna 22-8 and the wireless circuit 20. In addition, when the optical transceiver 13-4 receives the signal from the switch 11-4, the optical transceiver 13-4 converts the signal (electrical signal) into an optical signal and sends the optical signal to the wireless base station 3—3 via the optical fiber circuit 30.

As mentioned above, according to the mobile communication system of this embodiment, transmission form of the signal is unified regardless of transmission medium between the wireless base stations and between each wireless base station and the control station. Therefore, the wireless modems 10-1–10-3 and 14-1–14-N can be shared for each transmission medium. Thus, when a transmission medium is added or changed, it is enough to add or change the wireless transceiver or the optical transceiver. Therefore, it can be prevented that complicated work should be done as a conventional way.

Figure 3:
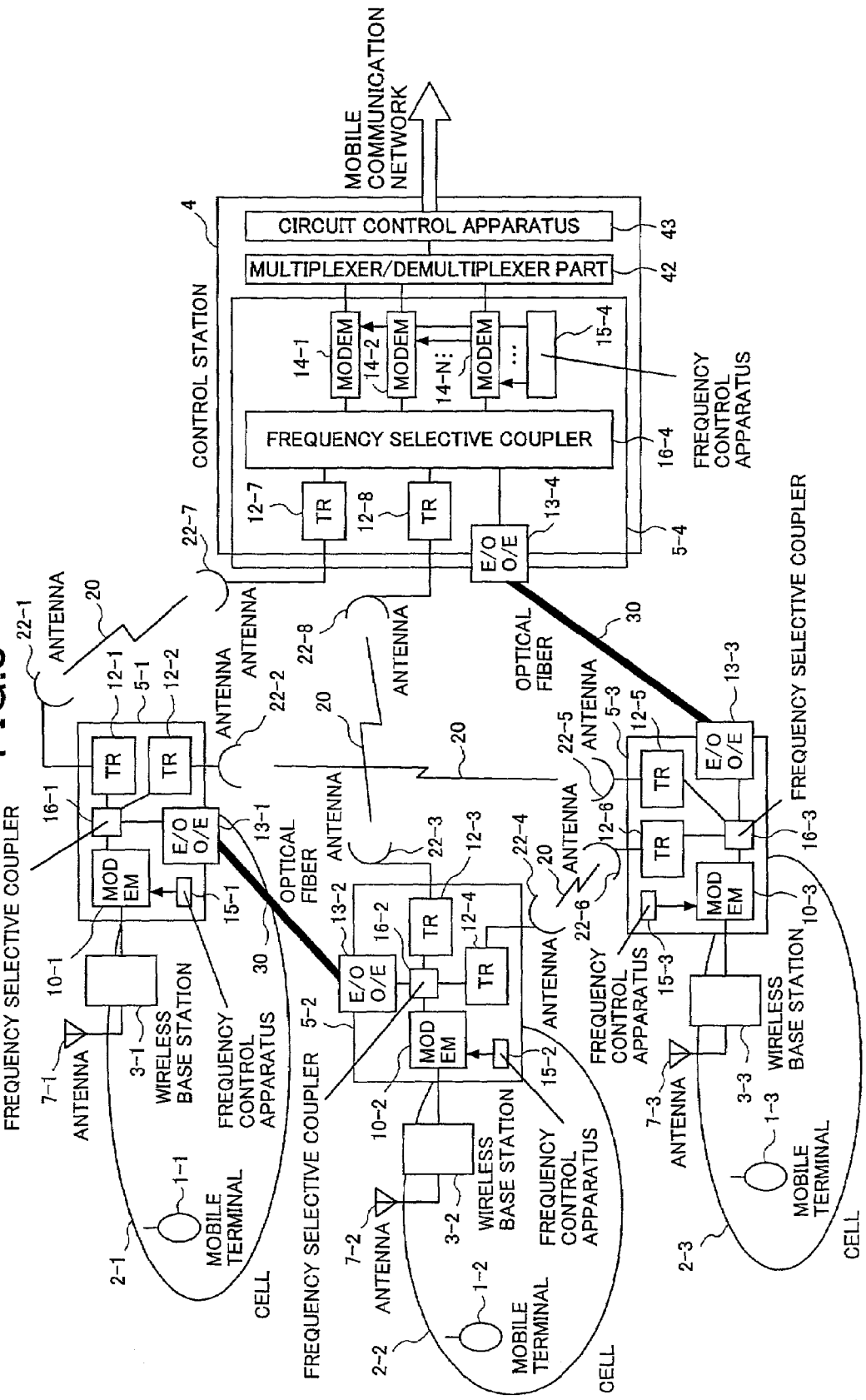
FIG. 3 shows a mobile communication system of a second embodiment of the present invention.

FIG. 3 is a mobile communication system of a second embodiment of the present invention. In the mobile communication system shown in the figure, a frequency of a signal transmitted to a destination is differentiated from a frequency of a signal transmitted to another destination. Compared with the mobile communication system shown in FIG. 2, frequency control apparatuses 15-1–15-3 are provided in the switching apparatuses 5-1–5-3 respectively, and frequency selective couplers 16-1–16-3 are provided instead of the switches 11-1–11-3. In addition, a frequency control apparatus 15-4 is provided in the switching apparatus 5-4, and a frequency selective coupler 16-4 is provided instead of the switch 11-4.

First, the frequency control apparatus 15-1 and the frequency selective coupler 16-1 in the switching apparatus 5-1 corresponding to the wireless base station 3-1 will be described. When a signal from the wireless base station 3-1 is sent to the wireless base station 3-2, 3—3 or the control station 4, the frequency control apparatus 15-1 recognizes which is a sending destination of the signal among the wireless base stations 3-2, 3—3 and the control station 4, and controls a frequency of the signal output from the wireless modem 10-1 according to the sending destination of the signal. The frequency selective coupler 16-1 has a function for switching a terminal to which the signal is output according to the frequency of the signal. Thus, the frequency selective coupler 16-1 outputs the signal to one of the wireless transceivers 12-1, 12-2 and the optical transceiver 13-1.

Figure 4:
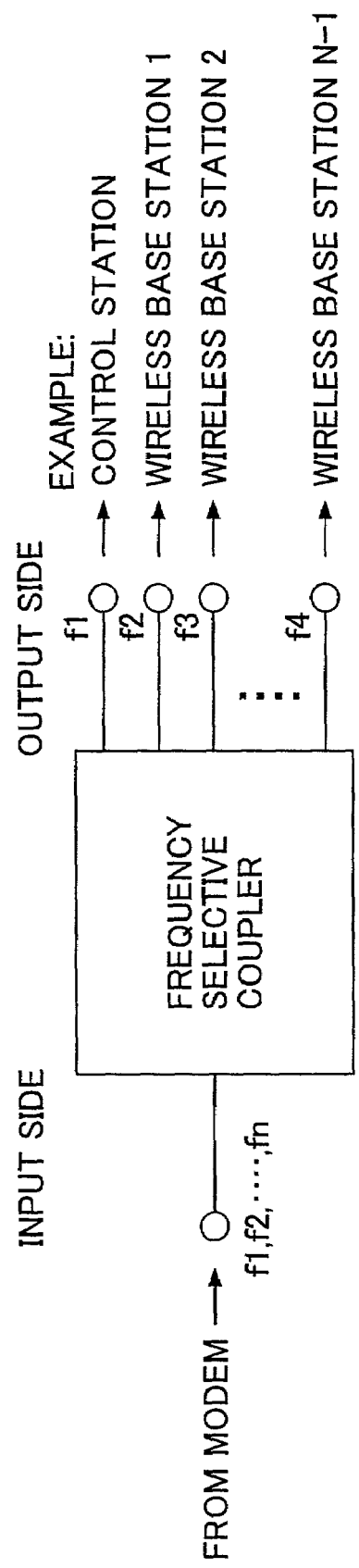
FIG. 4 shows an example of a frequency selective coupler.

FIG. 4 shows an example of the frequency selective coupler. The frequency selective coupler in the figure is provided in the switching apparatus corresponding to a wireless base station, and controls the switching apparatus for sending a signal to a wireless base station or the control station. When the frequency selective coupler receives a signal from a wireless modem, the frequency selective coupler switches an output terminal according to the frequency of the signal. Thus, when the frequency of the signal to be sent is f1, the signal is sent to the control station. Thus, the wireless modem converts the frequency of the signal to f1, and outputs the signal to the frequency selective coupler. Accordingly, routing of the signal can be performed without switching operation by the switch 11-1 in the first embodiment.

As mentioned above, since the frequency control apparatus 15-1 controls the frequency of the signal output from the wireless modem 10-1 according to the sending destination of the signal, it is enough that the frequency selective coupler changes the output terminal of the signal according to the frequency so that high speed switching can be performed.

When a signal from the wireless base station 3-2, 3—3 or the control station 4 is sent to the wireless base station 3-1, the frequency selective coupler 16-1 outputs the signal received by the wireless transceiver 12-1, 12-2 or the optical transceiver 13-1 to the wireless modem 10-1. In this case, when equal to or more than two signals are received simultaneously by any two of the wireless transceivers 12-1, 12-2 and the optical transceiver 13-1, the frequency selective coupler 16-1 selects the signal one by one and outputs the selected signal to the wireless modem 10-1.

A plurality of wireless modems may be provided such that more than one signals received simultaneously by the wireless transceivers and the optical transceiver can be demodulated. In this case, the frequency selective coupler 16-1 switches an output destination of the received signal to a wireless modem which can demodulates the received signal. Or, the frequency selective coupler 16-1 performs switching such that each signal is input to a different wireless modem, and the frequency control apparatus 15-1 controls each wireless modem such that each wireless modem can demodulate the input signal according to the frequency of the input signal.

The frequency control apparatuses 15-2, 15-3 and the frequency selective couplers 16-2, 16-3 in the switching apparatuses 5-2, 5-3 respectively are the same as the frequency control apparatus 15-1 and the frequency selective coupler 16-1.

Next, the frequency control apparatus 15-4 and the frequency selective coupler 16-4 in the switching apparatus 5-4 corresponding to the control station 4 will be described. When a signal is sent to the control station from the wireless base station 3-1–3—3, the frequency selective coupler 16-4 switches an output destination of the signal received by the wireless transceiver or the optical transceiver to one of the wireless modems 14-1–14-N which can demodulates the signal. Or, the frequency selective coupler 16-4 performs switching such that each signal is input to a different wireless modem, and the frequency control apparatus 15-4 controls each wireless modem such that each wireless modem can demodulate the input signal according to the frequency of the input signal.

When a signal is sent from the control station 4 to the wireless base station 3-1–3—3, the signal from the mobile communication network is input to the multiplexer/demultiplexer part 42 via the circuit control apparatus 43. The signal is demultiplexed by the multiplexer/demultiplexer part 42 and input into the wireless modems 14-1–14-N. The frequency control apparatus 15-4 recognizes which is a sending destination of the input signal among the wireless base stations 3-2, 3—3 and the control station 4, and controls a frequency of each signal output from the wireless modem 14-1–14-N according to the sending destination of the signal. Like the frequency selective coupler 16-1, the frequency selective coupler 16-4 has a function for switching a terminal to which a signal is output according to the frequency of the signal. Thus, the frequency selective coupler 16-4 outputs the signal to one of the wireless transceivers 12-7, 12-8 and the optical transceiver 13-4 according to the frequency of the signal. As mentioned above, since the frequency control apparatus 15-4 controls the frequency of each signal output from the wireless modems 14-1–14-N, it is enough that the frequency selective coupler 16-4 changes the output destination of the signal according to the frequency of the signal. Therefore, high speed switching operation becomes possible.

Figure 5:
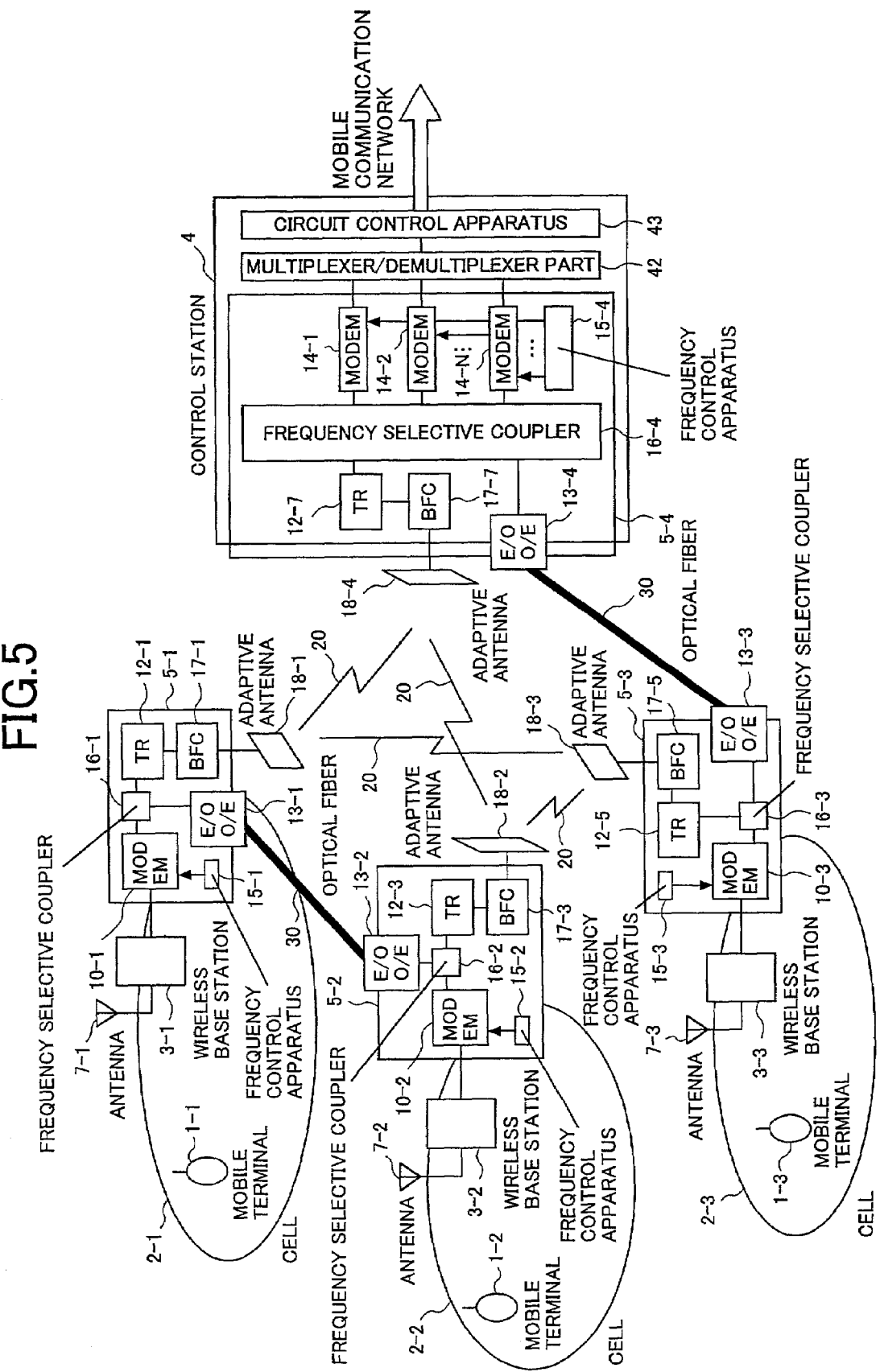
FIG. 5 shows a mobile communication system of a third embodiment of the present invention.

FIG. 5 shows a configuration example of a mobile communication system of a third embodiment of the present invention. Compared with the mobile communication system shown in FIG. 3, the switching apparatus 5-1 in the mobile communication system shown in FIG. 5 includes a wireless transceiver 12-1, a beam forming circuit (BFC) 17-1 and an adaptive antenna 18-1 instead of the two wireless transceivers 12-1, 12-2 and the antennas 22-1, 22-2. Like the switching apparatus 5-1, each of the switching apparatuses 5-2, 5-3 and the switching apparatus 5-4 includes a wireless transceiver, a beam forming circuit (BFC) and an adaptive antenna. In the following, the wireless transceiver 12-1, the beam forming circuit (BFC) 17-1 and the adaptive antenna 18-1 provided in the switching apparatus 5-1 corresponding to the wireless base station 3-1 will be described.

When a signal is sent to the wireless base station 3—3 or the control station 4 from the wireless base station 3-1, that is, when the signal is sent via the wireless circuit 20, the frequency selective coupler 16-1 outputs a signal from the wireless modem 10-1 to the wireless transceiver 12-1. The signal from the wireless transceiver 12-1 is sent to the adaptive antenna 18-1. At this time, the signal from the wireless transceiver 12-1 passes through the beam forming circuit 17-1 so that the adaptive antenna 18-1 is directed to the adaptive antenna 18-3 or to the adaptive antenna 18-4 which is a destination of the signal, wherein the adaptive antenna 18-3 is provided in the switching apparatus 5-3 corresponding to the wireless base station 3—3 and the adaptive antenna 18-4 is provided in the switching apparatus 5-4 corresponding to the control station 4. In the same way, when a signal is sent from the wireless base station 3—3 or from the control station 4 to the wireless base station 3-1, the adaptive antenna 18-1 is directed to the adaptive antenna 18-3 or the adaptive antenna 18-4 which is an originating point of the signal by the beam forming circuit 17-1. Accordingly, it becomes possible that the wireless transceiver and the antenna can be shared for a plurality of wireless circuits. Especially, if there are many wireless circuits between the wireless base stations or between the wireless base stations and the control station, the apparatus can be downsized by sharing the wireless transceiver and the antenna.

In the above-mentioned embodiments, the switching apparatuses 5-1–5-3 are provided in the outside of the wireless base stations 3-1–3—3. However, the switching apparatuses 5-1–5-3 can be provided in the inside of the wireless base stations 3-1–3—3. In addition, the switching apparatus 5-4 can be provided in the control station 4.

As mentioned above, according to the present invention, since the transmission form of the signal is unified irrespective of the transmission medium between the wireless base stations and between the wireless base stations and the control station, the wireless modem can be shared by a plurality of circuits. Therefore, the transmission medium can be selected freely so that a network independent of transmission mediums can be established. In addition, even when a circuit is interrupted, it becomes easy to transmit information by using another circuit.

As mentioned above, according to the present invention, the switching apparatus corresponding to the wireless base station or the control station in the sending side modulates a signal to be transmitted into a signal of a unified transmission form, and sends the signal to the switching apparatus of the wireless base station or the control station in the receiving side. That is, the signal is modulated such that the transmission form of the signal is unified. Therefore, the modulation means can be shared.

The present invention is not limited to the specifically disclosed embodiments, and variations and modifications may be made without departing from the scope of the invention.

What is claimed is:

1. A mobile communication system including a plurality of base stations, a control station which controls said base stations, and switching apparatuses each of which is a part of one of said base station or said control station, wherein said switching apparatuses are connected with each other by a wireless circuit or an optical fiber circuit, said switching apparatus in a sending side comprising:
   a modulation part configured to modulate a first signal into a second signal of a unified transmission form;
   a first switching part configured to switch an output destination of said second signal from said modulation part according to a sending destination of said second signal; and
   a wireless signal transmission part configured to send said second signal from said first switching part to a base station or a control station in a receiving side via a wireless circuit;
   an optical signal transmission part configured to send said second signal from said first switching part to a base station or a control station in a receiving side via an optical fiber circuit,
   said switching apparatus in a receiving side comprising:
   a wireless signal receiving part configured to receive a third signal via a wireless circuit;
   an optical signal receiving part configured to receive a third signal via an optical fiber circuit; and
   a demodulation part configured to demodulating said third signal.

2. The mobile communication system as claimed in claim 1, said switching apparatus in a sending side further comprising:
   a frequency control part configured to control a frequency of said second signal output from said modulation part according to said sending destination;
   wherein said first switching part switches said output destination according to said frequency of said second signal.

3. The mobile communication system as claimed in claim 1, said switching apparatus in a sending side further comprising:
   a variable directional antenna configured to send said second signal from said wireless signal transmission part to a destination via said wireless circuit; and
   a beam forming part configured to direct said variable directional antenna to an antenna of a base station or a control station in a receiving side according to said frequency of said second signal.

4. The mobile communication system as claimed in claim 2, said switching apparatus in a sending side further comprising:
   a variable directional antenna configured to send said second signal from said wireless signal transmission part to a destination via said wireless circuit; and
   a beam forming part configured to direct said variable directional antenna to an antenna of a base station or a control station in a receiving side according to said frequency of said second signal.

5. The mobile communication system as claimed in claim 1, said switching apparatus in a receiving side further comprising a second switching part configured to switch an output destination of said third signal to a demodulation part.

6. The mobile communication system as claimed in claim 5, wherein said second switching part switches said output destination of said third signal according to a frequency of said third signal.

7. The mobile communication system as claimed in claim 1, said switching apparatus in a receiving side further comprising a selection part configured to select a fourth signal and outputting said fourth signal to said demodulation part when a plurality of signals are received.

8. The mobile communication system as claimed in claim 1, said switching apparatus in a receiving side further comprising a frequency control part configured to control said demodulation part such that said demodulation part can demodulate said third signal according to a frequency of said third signal.

9. The mobile communication system as claimed in claim 1, said switching apparatus in a receiving side further comprising:
   a variable directional antenna configured to receive said third signal from said wireless circuit and outputting said third signal to said wireless signal receiving part;
   a beam forming part configured to direct said variable directional antenna to an antenna of a base station or a control apparatus in a sending side.

10. The mobile communication system as claimed in claim 9, wherein said beam forming part directs said variable directional antenna to an antenna according to a frequency of said third signal.

11. A switching apparatus in a mobile communication system including a plurality of base stations and a control station which controls said base stations, each of said base stations and said control station having said switching apparatus, said switching apparatus being connected to another switching apparatus via a wireless circuit or an optical fiber circuit, said switching apparatus comprising:
   a modulation part configured to modulate a first signal into a second signal of a unified transmission form;

a first switching part configured to switching an output destination of said second signal from said modulation part according to a sending destination of said second signal; and a wireless signal transmission part configured to send said second signal from said first switching part to a base station or a control station in a receiving side via a wireless circuit; and an optical signal transmission part configured to send said second signal from said first switching part to a base station or a control station in a receiving side via an optical fiber circuit.

12. The switching apparatus as claimed in claim 11, further comprising:

a frequency control part configured to control a frequency of said second signal output from said modulation part according to said sending destination;

wherein said first switching part switches said output destination according to said frequency of said second signal.

13. The switching apparatus as claimed in claim 11, further comprising:

a variable directional antenna configured to send said second signal from said wireless signal transmission part to a destination via said wireless circuit; and a beam forming part configured to direct said variable directional antenna to an antenna of a base station or a control station in a receiving side.

14. The switching apparatus as claimed in claim 12, further comprising:

a variable directional antenna configured to send said second signal from said wireless signal transmission part to a destination via said wireless circuit; and a beam forming part configured to direct said variable directional antenna to an antenna of a base station or a control station in a receiving side according to said frequency of said second signal.

15. A switching apparatus in a mobile communication system including a plurality of base stations and a control station which controls said base stations, each of said base stations and said control station having said switching apparatus, said switching apparatus being connected to another switching apparatus via a wireless circuit or an optical fiber circuit, said switching apparatus comprising:

a wireless signal receiving part configured to receive a first signal of a unified transmission form suitable for transmission through a wireless circuit and an optical fiber circuit via a wireless circuit;

an optical signal receiving part configured to receive a first signal of a unified transmission form suitable for transmission through a wireless circuit and an optical fiber circuit via an optical fiber circuit; and a demodulation part configured to demodulate said first signal of a unified transmission form suitable for transmission through a wireless circuit and an optical fiber circuit when received by the wireless signal receiving part and also when received by the optical signal receiving part.

16. The switching apparatus as claimed in claim 15, further comprising a switching part configured to switch an output destination of said first signal to a demodulation part.

17. The switching apparatus as claimed in claim 16, wherein said switching part switches said output destination of said first signal according to a frequency of said first signal.

18. The switching apparatus as claimed in claim 15, further comprising a selection part configured to select a second signal and outputting said second signal to said demodulation part when a plurality of signals are received.

19. The switching apparatus as claimed in claim 15, further comprising a frequency control part configured to control said demodulation part such that said demodulation part can demodulate said first signal according to a frequency of said first signal.

20. The switching apparatus as claimed in claim 15, further comprising:

a variable directional antenna configured to receive said first signal from said wireless circuit and outputting said first signal to said wireless signal receiving part;

a beam forming part configured to direct said variable directional antenna to an antenna of a base station or a control apparatus in a sending side.

21. The switching apparatus as claimed in claim 20, wherein said beam forming part directs said variable directional antenna to an antenna according to a frequency of said first signal.

* * * * *